(12) United States Patent
Cheng et al.

(10) Patent No.: US 7,519,236 B2
(45) Date of Patent: Apr. 14, 2009

(54) IMAGE RETRIEVAL

(75) Inventors: Min Cheng, Hangzhou (CN); Wei Xiong, Fremont, CA (US); Lingxiang Zhou, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 862 days.

(21) Appl. No.: 10/411,532

(22) Filed: Apr. 9, 2003

(65) Prior Publication Data
US 2004/0202385 A1  Oct. 14, 2004

(51) Int. Cl.
  *G06K 9/62*  (2006.01)
  *G06K 9/60*  (2006.01)
(52) U.S. Cl. ..................... 382/305; 382/209
(58) Field of Classification Search ............ 382/305
See application file for complete search history.

(56) References Cited

U.S. PATENT DOCUMENTS

| | | | | |
|---|---|---|---|---|
| 5,172,245 A | * | 12/1992 | Kita et al. ............ | 358/403 |
| 5,914,748 A | * | 6/1999 | Parulski et al. ........ | 348/239 |
| 5,995,639 A | * | 11/1999 | Kado et al. ........... | 382/118 |
| 6,011,857 A | * | 1/2000 | Sowell et al. ......... | 382/100 |
| 6,128,398 A | * | 10/2000 | Kuperstein et al. ..... | 382/118 |
| 6,324,545 B1 | * | 11/2001 | Morag ................ | 707/202 |
| 6,363,168 B1 | * | 3/2002 | Kakuma ............... | 382/151 |
| 6,735,329 B2 | * | 5/2004 | Schultz .............. | 382/128 |
| 7,020,352 B2 | * | 3/2006 | O'Callaghan et al. ... | 382/305 |
| 2003/0059111 A1 | * | 3/2003 | Druitt et al. ........ | 382/173 |
| 2004/0120606 A1 | * | 6/2004 | Fredlund ............. | 382/305 |

* cited by examiner

*Primary Examiner*—Matthew C. Bella
*Assistant Examiner*—Alex Liew
(74) *Attorney, Agent, or Firm*—Patent Law Group LLP; David C. Hsia

(57) ABSTRACT

A method for searching an image database includes capturing an image of a photograph and a background, determining a boundary of the photograph in the image, cropping the photograph from the image, correcting the perspective of the photograph, compensating colors of the photograph, and matching the photograph with an image in the image database.

17 Claims, 4 Drawing Sheets

IMAGE RETRIEVAL

FIELD OF INVENTION

This invention relates to a method to retrieve an image from a database.

DESCRIPTION OF RELATED ART

With the growing popularity of digital cameras and the rapid increase of storage capacity, it is common for consumers to store thousands of photos on a personal computer or through a photo-sharing website. Content-based image retrieval (CBIR) is therefore becoming a necessity. Although there are various query methods in CBIR systems, query by example has received wide acceptance. Query by example requires the least user interaction and the query image contains more useful information for matching than other forms of query such as query by drawing.

There are several well-known CBIR systems, such as QBIC (Query By Image Content) of IBM, Photobook of Massachusetts Institute of Technology, VisualSEEk and WebSEEk of Columbia University, and MARS (Multimedia Analysis and Retrieval System) of University of Illinois at Urbana-Champaign. All these systems have query by example function.

In most CBIR systems, the user selects a query image from by the same database that is to be searched, and the query image is used to search for similar images in the database. This is not useful when the user is looking for a specific image. For example, the user may want to reprint a photograph from a large database. The user has the previously printed photograph on hand and wants to find the same photograph in the database to order reprints. Thus, what is needed is a method for to retrieve a specific image from a database when the user has a hard copy of the image.

SUMMARY

In one embodiment of the invention, a method for searching an image database includes capturing an image of a photograph and a background, determining a boundary of the photograph in the image, cropping the photograph from the image, correcting the perspective of the photograph, compensating colors of the photograph, and matching the photograph with an image in the image database.

DETAILED DESCRIPTION

In accordance with the invention, a method is provided to (1) detect a photograph from a complicated background in an image captured by a camera, and (2) search for images similar to the photograph in a database.

Figure 1:
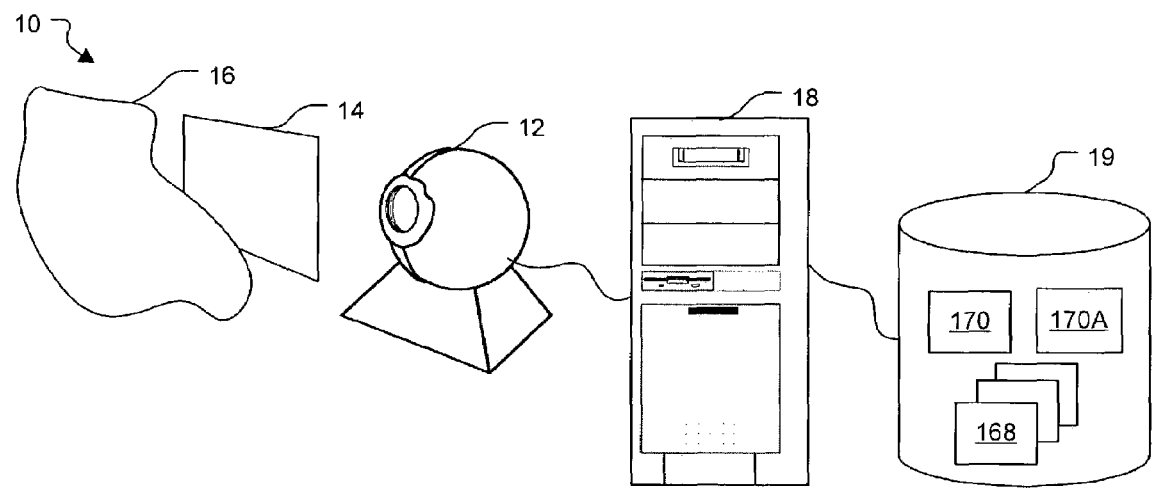
FIG. 1 illustrates a system for searching images in a database in one embodiment of the invention.

FIG. 1 illustrates an image retrieval system 10 in one embodiment of the invention. System 10 includes a camera 12 that captures an image of a query photograph 14 and a background 16. Camera 12 can be a digital video camera (e.g., a WebCam) or a digital still camera. Alternatively, a scanner or another type of image input device can be used instead of camera 12.

Camera 12 outputs the captured image to a computer 18. Camera 12 can be coupled to computer 18 as a peripheral device or over a network connection (e.g., through a client computer that is connected to a server computer 18 over the Internet). Accordingly, computer 18 can be a local desktop or a remote server used to search images in a database 19. Database 19 can be part of computer 18 or an independent device coupled to computer 18.

Figure 2:
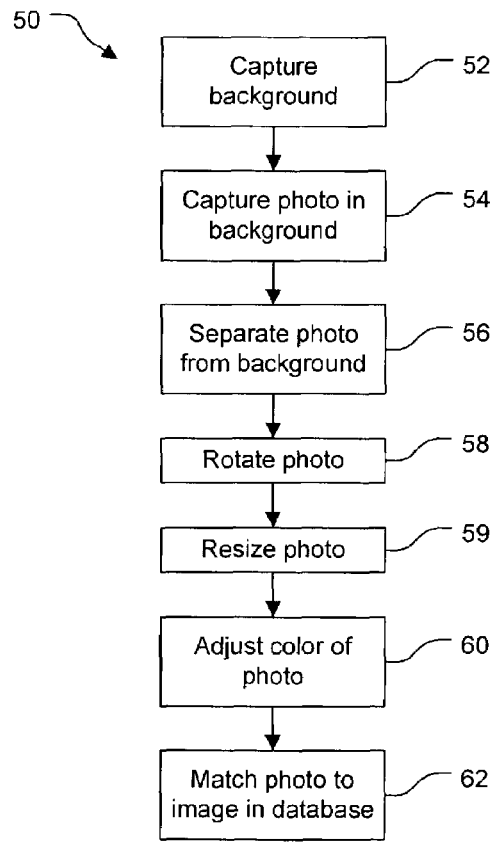
FIGS. 2, 4, 7, and 8 are flowcharts of methods for searching images in a database in embodiments of the invention.
Figure 3A:
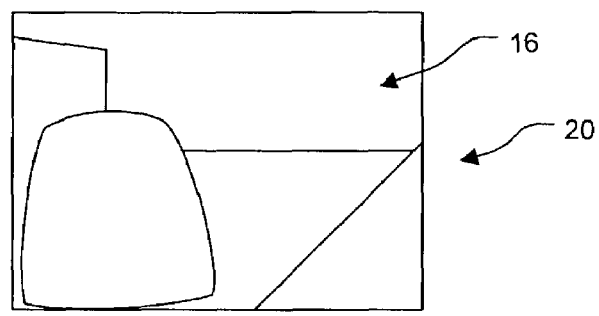
FIGS. 3A, 3B, 5A, 5B, 6A, and 6B illustrate images captured or generated in the methods of FIGS. 2, 4, 7, and 8 in embodiments of the invention.

FIG. 2 is a flowchart of a method 50 implemented by system 10 to search images in database 19 in one embodiment. In step 52, camera 12 captures background 16 in an image 20 (FIG. 3A).

Figure 3B:
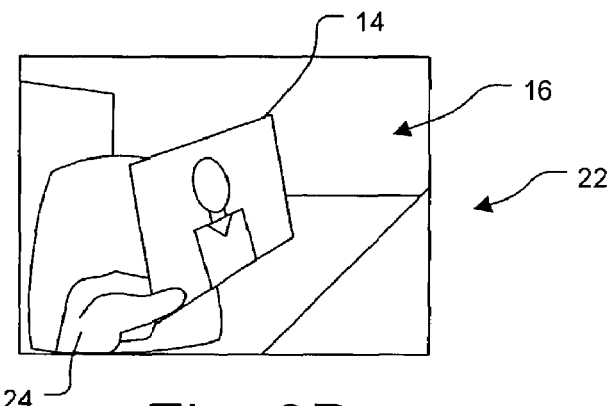

In step 54, camera 12 captures photograph 14 and background 16 in an image 22 (FIG. 3B). Typically the user holds up photograph 14 with his or her hand 24. Photograph 14 and hand 24 make up the foreground in image 22 against background 16 in image 22. For a good result, photograph 14 is substantially centered and within the field of view of camera 12 and makes up the principal portion of image 22. Image 22 is then transmitted to computer 18. If computer 18 is a server computer, image 22 is transmitted from the user's computer (e.g., a client computer) to a server computer 18 over a network (e.g., the Internet).

In step 56, computer 18 separates photograph 14 from the background of image 22. Typically, Hough Transformation is used to detect straight lines that form the boundary of an object. However, lines in photograph 14 and background 16 may be mistaken for the boundary of photograph 14. One embodiment of step 56 that addresses these problems is described in more detail later in reference to FIG. 4.

If a scanner instead of camera 12 is used, the scanner may come with software that separates photography 14 from the scanner cover that makes up background 16. This is a simple step since the scanner cover provides a consistent white background. Alternatively, photography 14 is placed in a designated area for the software to crop.

Figure 6A:
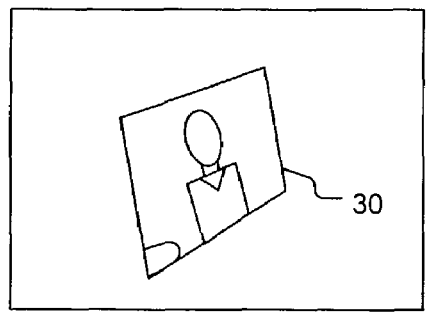
Figure 6B:
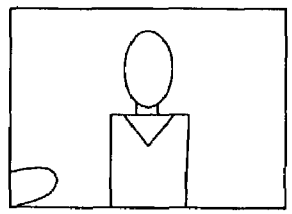

In step 58, computer 18 rotates photograph 14 to compensate the perspective at which camera 12 captured photograph 14. Computer 18 can rotate photograph 14 by Affine Transformation as shown in the transition from FIG. 6A to FIG. 6B.

In step 59, computer 18 resizes photograph 14 to a resolution that matches the resolution of the images in database 19. A set of the images in database 19 saved at a low resolution (e.g., 96 by 96 pixels resolution) can also be used to speed up the matching process.

In step 60, computer 18 adjusts the color of photograph 14 to compensate the environment (e.g., lighting, distance, and angle) under which camera 12 captured photograph 14. If the color of photograph 14 is not adjusted, it may be difficult to find similar images using color feature matching because the color of photograph 14 in image 22 depends on the environment. One embodiment of step 60 is described later in reference to FIG. 7.

In step 62, computer 18 searches for one or more images 168 (FIG. 1) in database 19 that are similar to photograph 14. Computer 18 can search for similar images by comparing edge features, texture features, color features, or a combination thereof. Furthermore, computer 18 can receive relevance feedback from the user. According to the relevance feedback from the user, computer 18 can adjust the weight of the edge features, texture features, and color features to produce a better search result. Images 168 that match photograph 14 are provided to the user. If computer 18 is a desktop, the result is displayed to the user. If computer 18 is a server computer, the result is transmitted to the user's computer (e.g., a client computer) over a network (e.g., the Internet).

Figure 4:
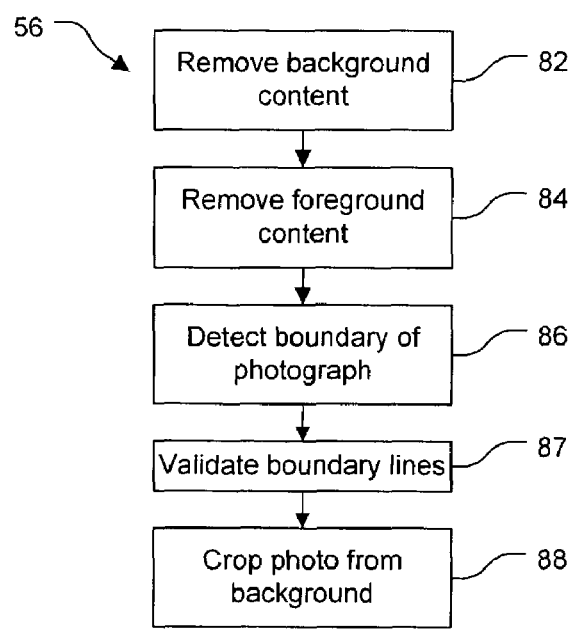

FIG. 4 is a flowchart of step 56 that determines the boundary of photograph 14 in one embodiment. As described above, this embodiment of step 56 reduces the influence of the photograph and background content.

Figure 5A:
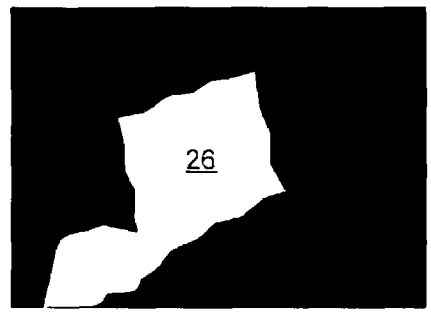

In step 82, computer 18 removes the content of the background from image 22. To do so, computer 18 compares images 20 and 22 to determine a region 26 (FIG. 5A) on image 22 where the pixels have changed in their RGB values. Assuming background 16 is static, region 26 should be the foreground that includes photograph 14 and hand 24 that is holding photograph 14. Computer 18 thus removes all the pixels outside of region 26. The removed portion of the background is shown in black in FIG. 5A.

In step 84, computer 18 removes the content inside region 26. To do so, computer 18 scans region 26 line by line, first vertically and then horizontally. For each line, computer 18 preserves the first pixel and the last pixel, and removes the intermediate pixels. Thus, only the pixels that make up a perimeter 28 (FIG. 5B) of region 26 remains and all other pixels that make up the content of region 26 are removed. The removed portion of region 26 is shown in black in FIG. 5B.

Figure 5B:
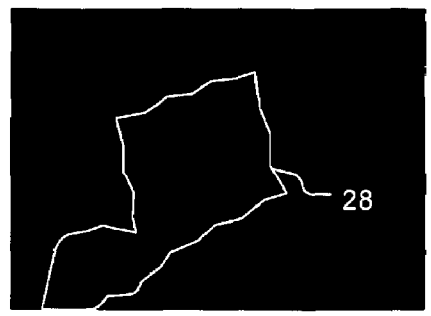

In step 86, computer 18 determines a boundary 30 (FIG. 6A) of photograph 14 from perimeter 28 (FIG. 5B). In this step, photograph 14 is assumed to be a rectangular print that is titled at an angle no more than 45 degrees. Computer 18 can determine boundary 30 by Hough Transformation. In Hough Transformation, a straight line is represented by the following formula:

$$x \cos \theta + y \sin \theta = \rho \tag{1}$$

where x and y are the coordinates of a pixel that form part of the line, $\theta$ is the normal angle of the line to the origin, and $\rho$ is the normal distance of the line to the origin.

The Hough Transformation is performed in the following fashion. First, computer 18 assigns the origin of the coordinates to the center of image 22. Second, computer 18 quantizes angle $\theta$ and distance $\rho$ for the pixels that make up perimeter 28 (FIG. 5B). The results are stored as Hough accumulators. Third, the value pairs ($\theta$, $\rho$) of the four largest accumulators are used as the parameters of the four straight lines that make up boundary 30 (FIG. 6A) of photograph 14.

When searching for the left and right boundary lines, angle $\theta$ is only quantized between 45° to 135°, and distance $\rho$ is only quantized between 0 to half the width of image 22. Similarly, when searching for the top and bottom boundary lines, angle $\theta$ is only quantized between −45° to 45°, and distance $\rho$ is only quantized between 0 to half the height of image 22.

In step 87, computer 18 validates the four boundary lines determined by Hough Transformation. This may be necessary because the result may degrade when (1) a boundary line is located too close to, or occluded by, an edge of image 22, or (2) when user hand 24 is mixed in region 26. This embodiment is described later in reference to FIG. 8.

In step 88, computer 18 crops photograph 14 from image 22.

Figure 7:
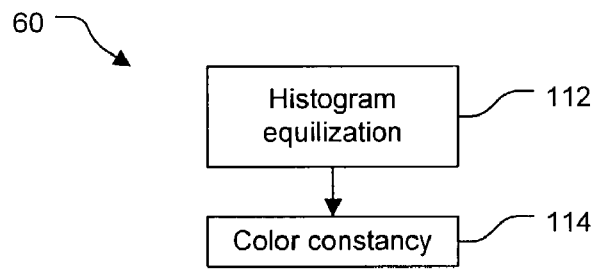

FIG. 7 is a flowchart of step 60 that adjusts the color of photograph 14 in one embodiment. As described above, this step may be necessary to compensate for the different environments under which camera 12 captures photograph 14.

In step 112, computer 18 adjusts the color levels of photograph 14 by histogram equalization to uniformly distribute the color levels of photograph 14. This will compensate changes in the distance and angle at which photographs are captured by camera 12.

In step 114, computer 18 adjusts the RGB values of photograph 14 to maintain color constancy. To do this, system 10 is first calibrated with an image 170 (FIG. 1) with a reference color pattern. In one embodiment, the reference color pattern consists of individual square blocks of different colors. The colors of the square block range from a warm color to a cold color (e.g., from red to purple). In one embodiment, color numbers 18 to 25 are used. The neighboring blocks should have large intensity differences so that computer 18 can detect every color easily and accurately without user intervention.

Image 170 can be stored in database 19. Image 170 is assumed to be captured under standard (i.e., canonical) lighting. A hard copy of image 170 is captured as image 170A with camera 12 under an unknown lighting. The unknown lighting is assumed to be the environment under which all the photographs are captured by camera 12. Computer 18 then determines a homography matrix that transforms the RGB values of image 170 to the RGB values of image 170A. The inverse of the homography matrix is subsequently used to transform other images captured by camera 12 to approximate their RGB values under canonical lighting.

The determination of the homography matrix is now described in detail. Assume the relationship between the unknown and canonical lighting can be modeled by the following formula:

$$U^{(21)} = MU^{(11)} + \lambda C \tag{2}$$

where $U^{(21)}$ is the RBG value of a pixel under the unknown lighting, M is the homography miatrix, $U^{(11)}$ is the RGB value of the corresponding pixel under the canonical lighting, C is the illuminant parameter, and $\lambda$ is a scaling factor for illuminant parameter C. Equation (2) can be rewritten as follows:

$$\begin{bmatrix} R \\ G \\ B \end{bmatrix}^{(21)} = \begin{bmatrix} m_{11} & m_{12} & m_{13} \\ m_{21} & m_{22} & m_{23} \\ m_{31} & m_{32} & m_{33} \end{bmatrix} \begin{bmatrix} R \\ G \\ B \end{bmatrix}^{(11)} + \lambda \begin{bmatrix} C_1 \\ C_2 \\ C_3 \end{bmatrix} \tag{3}$$

or $$R^{(21)} = m_{11}R^{(11)} + m_{12}G^{(11)} + m_{13}B^{(11)} + \lambda C_1 \tag{4}$$

$$G^{(21)} = m_{21}R^{(11)} + m_{22}G^{(11)} + m_{23}B^{(11)} + \lambda C_2 \tag{5}$$

$$B^{(21)} = m_{31}R^{(11)} + m_{32}G^{(11)} + m_{33}B^{(11)} + \lambda C_3 \tag{6}$$

Equations (4), (5), and (6) can be written as follows:

$$\underline{A}\,\underline{m} = \underline{b} \tag{7}$$

For n point correspondences, the (3n×12)-matrix can be expressed as:

$$A = \begin{bmatrix} R_1^{(11)} & G_1^{(11)} & B_1^{(11)} & 0 & 0 & 0 & 0 & 0 & 0 & 1 & 0 & 0 \\ 0 & 0 & 0 & R_1^{(11)} & G_1^{(11)} & B_1^{(11)} & 0 & 0 & 0 & 0 & 1 & 0 \\ 0 & 0 & 0 & 0 & 0 & 0 & R_1^{(11)} & G_1^{(11)} & B_1^{(11)} & 0 & 0 & 1 \\ \vdots & \vdots & \vdots & \vdots & \vdots & \vdots & \vdots & \vdots & \vdots & \vdots & \vdots & \vdots \\ R_n^{(11)} & G_n^{(11)} & B_n^{(11)} & 0 & 0 & 0 & 0 & 0 & 0 & 1 & 0 & 0 \\ 0 & 0 & 0 & R_n^{(11)} & G_n^{(11)} & B_n^{(11)} & 0 & 0 & 0 & 0 & 1 & 0 \\ 0 & 0 & 0 & 0 & 0 & 0 & R_n^{(11)} & G_n^{(11)} & B_n^{(11)} & 0 & 0 & 1 \end{bmatrix} \quad (8)$$

The vector $\underline{m}$ of unknowns $m_{ij}$ and $\lambda C_i$ can be expressed as:

$$\underline{m} = [m_{11}\, m_{12} \ldots m_{33}\, \lambda C_1\, \lambda C_2\, \lambda C_3]^T \quad (9)$$

The (3n)-vector can be expressed as:

$$\underline{b} = [R_1^{(21)}\, G_1^{(21)}\, B_1^{(21)} \ldots R_n^{(21)}\, G_n^{(21)}\, B_n^{(21)}]^T \quad (10)$$

The solution for $\underline{m}$ is given by $$\underline{m} = (\underline{A}^T \underline{A})^{-1}(\underline{A}^T \underline{b}) \quad (11)$$

After finding vector $\underline{m}$, it is assumed that this homography (equation (2)) is valid not only to transform the reference image 170 under canonical lighting to what it will appear under the unknown lighting, but also to convert images of photographs under the canonical lighting to what they will appear under the same unknown lighting. Consequently, the inverse of matrix M in equation (2) can be calculated to convert the RGB values of all the pixels of the photography captured under unknown lighting to their corresponding RGB values under the canonical lighting as follows:

$$U^{(11)} = M^{-1}(U^{(21)} - \lambda C) \quad (12)$$

Figure 8:
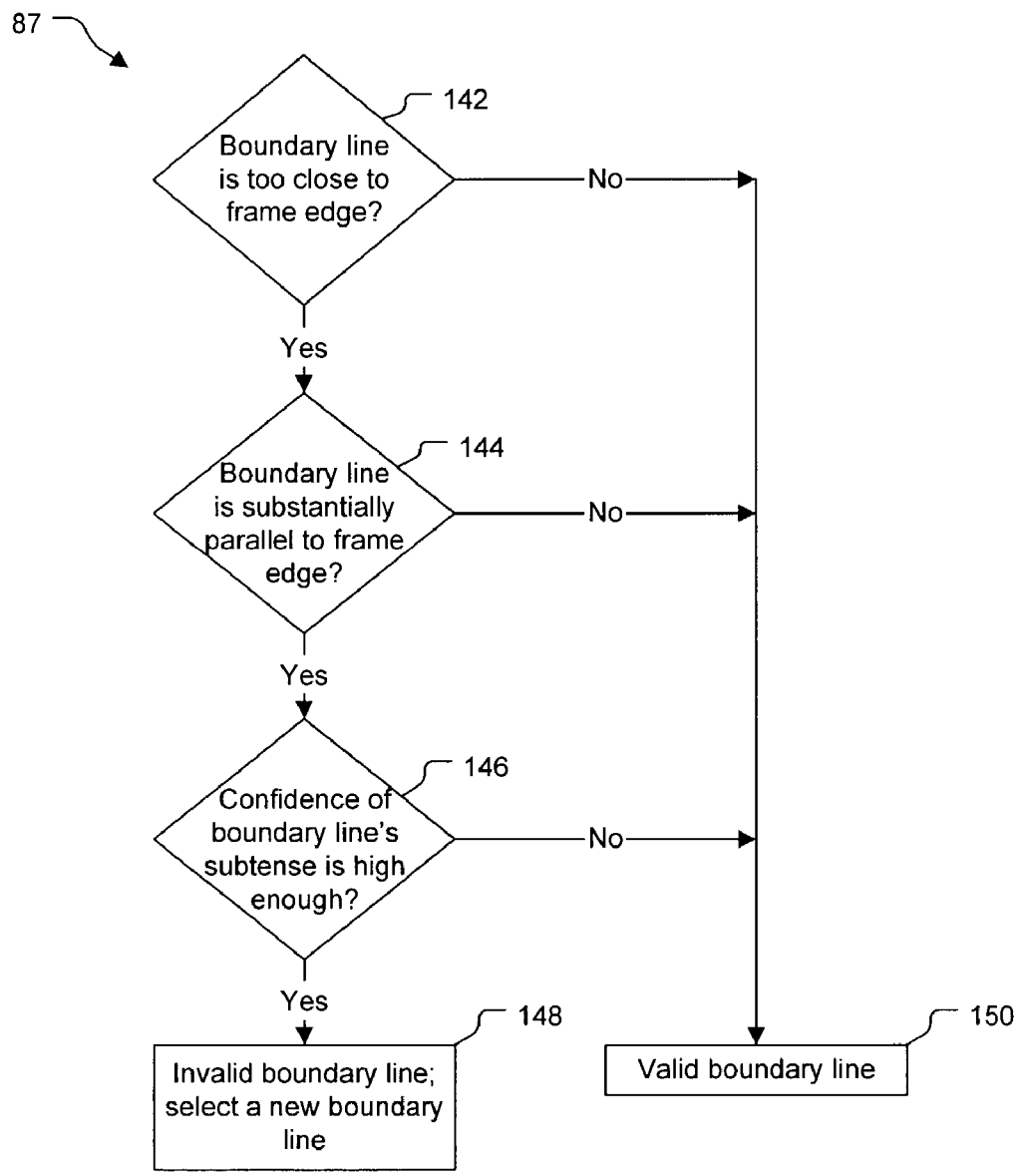

FIG. 8 is a flowchart of one embodiment of step 87 that validates the boundary lines determined from Hough Transformation. As described above, step 87 may be necessary when (1) a boundary line is located too close to, or occluded by, an edge of image 22, or (2) when user hand 24 is mixed in region 26. Step 87 is performed for each of the boundary lines.

In step 142, computer 18 determines if the boundary line is too close to the corresponding edge (e.g., if the left boundary line is too close the left edge of image 22). A boundary line is too close to the corresponding edge when the shortest distance between them is less than a threshold. In one embodiment, the boundary line is too close to the corresponding edge when the shortest distance between the boundary line and the corresponding edge is less than 8 pixels. If so, step 142 is followed by step 144. If the boundary line is not too close to the corresponding edge, then step 144 is followed by 150.

In step 144, computer 18 determines if the boundary line is substantially parallel to the corresponding edge. In one embodiment, the boundary line is substantially parallel to the corresponding edge when their angles are within 3 degrees. If so, step 144 is followed by step 146. If the boundary line is not substantially parallel to the corresponding edge, then step 146 is followed by 150.

In step 146, computer 18 determines if the confidence (i.e., the Hough accumulator value) of the boundary line's subtense is high enough. A boundary line's subtense is the opposite boundary line in perimeter 30 of region 26. In one embodiment, the confidence of the boundary line's subtense is high enough when it is greater than 60. If so, step 146 is followed by step 148. If the confidence of the boundary line's subtense is not high enough, step 146 is followed by step 150.

In step 148, computer 18 invalidates the boundary line and searches for a new boundary line. For the new boundary line, computer 18 can limits its search to lines having angles θ between ±30° of the angle θ of the invalid boundary line's subtense.

In step 150, computer 18 validates the boundary line.

Various other adaptations and combinations of features of the embodiments disclosed are within the scope of the invention. Numerous embodiments are encompassed by the following claims.

What is claimed is:

1. A method for retrieving an image from an image database, comprising:
   capturing a first image of a printed photograph against a background using an image input device;
   determining a boundary of the printed photograph from the background in the first image, using a processor, comprising:
      capturing a second image of the background without the printed photography using the image input device;
      determining differences between the first and the second images, the differences defining a region;
      determining a perimeter of the region; and
      determining boundary lines from the perimeter, the boundary lines defining the boundary of the printed photograph from the background in the first image, said determining boundary lines comprising:
         performing Hough Transformation to detect the boundary lines from the perimeter;
         invalidating a boundary line when the boundary line is too close to a corresponding edge of the first image, the boundary line is substantially parallel to the corresponding edge, and a confidence in the boundary line's subtense is high; and
         searching for another boundary line to replace the boundary line after said invalidating;
   cropping the printed photograph from the first image to form a third image of the printed photograph; and
   matching the third image with a fourth image in the image database.

2. The method of claim 1, wherein said determining a perimeter of the region comprises:
   scanning each of horizontal and vertical lines that comprise the region; and
   reserving a first pixel and a last pixel in each of the horizontal and the vertical lines as pixels that comprise the perimeter of the region.

3. The method of claim 1, wherein said searching for another boundary line comprises:

using Hough Transformation to detect said another boundary line, wherein the angle of said another boundary line is limited within a range of the angle of the invalid boundary line's subtense.

4. The method of claim 1, further comprising rotating the third image after said cropping and before said matching.

5. The method of claim 4, wherein said rotating the third image comprises performing an Affine Transformation.

6. The method of claim 4, further comprising, resizing the third image before said matching.

7. The method of claim 1, wherein said matching comprises using at least one of edge feature matching, texture feature matching, and color feature matching to match the third image to images in the image database.

8. The method of claim 1, further comprising compensating colors of the third image before said matching.

9. The method of claim 8, wherein said compensating colors of the third image comprises performing histogram equalization to the third image.

10. The method of claim 8, wherein said compensating colors of the third image comprises performing color constancy to the third image.

11. A method for searching an image database, comprising:
capturing a first image of a printed photograph against a background using an image input device;
determining a boundary of the printed photograph from the background in the first image, using a processor;
cropping the printed photograph from the first image to form a second image of the printed photograph;
compensating colors of the second image of the printed photograph, said compensating colors comprising performing color constancy to the second image of the printed photograph, said performing color constancy comprising transforming the second image of the printed photograph using an inverse homography matrix to approximate RGB values of the second image under a first lighting condition; and
matching the second image with a third image in the image database.

12. The method of claim 11, wherein said performing color constancy further comprises:
generating a physical copy of a reference image, wherein the reference image is assumed to be captured under the first lighting condition;
capturing a test image of the physical copy under a second lighting condition with the image input device;
determining a homography matrix that transforms RGB values of the reference image under the first lighting condition to RGB values of the physical copy under the second lighting condition; and
inverting the homography matrix to generate the inverse homography matrix.

13. The method of claim 12, wherein the reference image comprises a plurality of blocks having different colors.

14. The method of claim 1, wherein the image input device is selected from the group consisting a digital video camera, a digital still camera, and a scanner.

15. The method of claim 6, further comprising, transmitting the first image from a client computer over a network to a sewer computer, wherein said capturing and said transmitting are performed by the client computer.

16. The method of 15, wherein said determining a boundary, said cropping, said rotating, said resizing, and said matching are performed by the server computer.

17. The method of claim 16, further comprising:
transmitting by the server computer the fourth image to the client computer; and
displaying by the client computer the fourth image.

* * * * *